United States Patent
Meyer et al.

(12) 
(10) Patent No.: US 6,187,357 B1
(45) Date of Patent: Feb. 13, 2001

(54) EXTENDED SHELF LIFE NOODLE PRODUCT AND PROCESS OF MANUFACTURE

(75) Inventors: Philipp Paul Meyer, Benglen (CH); Göran Jaelminger, Helsingborg (SE); Eugene Scoville, New Milford, CT (US)

(73) Assignee: Nestec S.A., Vevey (CH)

( * ) Notice: Under 35 U.S.C. 154(b), the term of this patent shall be extended for 0 days.

(21) Appl. No.: 09/342,178

(22) Filed: Jun. 29, 1999

(30) Foreign Application Priority Data

Jun. 30, 1998 (EP) .................................................. 98202188

(51) Int. Cl.⁷ ................................ A21D 6/00; A23L 1/10
(52) U.S. Cl. ......................... 426/502; 426/503; 426/509
(58) Field of Search ..................................... 426/128, 321, 426/324, 557, 502, 503, 509

(56) References Cited

U.S. PATENT DOCUMENTS

| | | | | |
|---|---|---|---|---|
| 4,483,879 | * | 11/1984 | Sugisawa et al. | 426/451 |
| 4,552,772 | | 11/1985 | Saitoh et al. | 426/557 |
| 4,734,291 | * | 3/1988 | Raffensperger | 426/325 |
| 4,828,852 | | 5/1989 | Hsu et al. | 426/94 |
| 5,332,587 | | 7/1994 | Howard et al. | 426/128 |
| 5,433,964 | * | 7/1995 | Norman et al. | 426/303 |

FOREIGN PATENT DOCUMENTS

| | | |
|---|---|---|
| 0484669 A1 | 5/1992 | (EP) . |
| 0602953 A2 | 6/1994 | (EP) . |
| 0745331 A2 | 12/1996 | (EP) . |
| 0807386 A2 | 11/1997 | (EP) . |
| 2502907 | 10/1982 | (FR) . |
| 59-102365 | 6/1984 | (JP) . |
| 01074958 | 3/1989 | (JP) . |

OTHER PUBLICATIONS

WPI Account No. 89–127505/198903, English–language Abstract for JP01074958.
European Patent Office, Patent Abstract of Japan, Abstract for 01074958.

* cited by examiner

Primary Examiner—Nina Bhat
(74) Attorney, Agent, or Firm—Pennie & Edmonds LLP

(57) ABSTRACT

The present invention is directed to a noodle product of extended shelf life and to a method of preparing the noodle product. More specifically, the present invention includes a full moisture extended shelf life noodle product of outstanding organoleptical quality which is easily prepared with little or no further cooking by the consumer. Additionally, the present invention is directed to a manufacturing process of the noodle product which can be easily performed using conventional machinery.

10 Claims, No Drawings

EXTENDED SHELF LIFE NOODLE PRODUCT AND PROCESS OF MANUFACTURE

BACKGROUND OF THE INVENTION

The present invention is directed to a noodle product of extended shelf life and to a method of preparing the noodle product. More specifically, the present invention includes a full moisture extended shelf life noodle product of outstanding organoleptical quality which is easily prepared with little or no further cooking by the consumer. Additionally, the present invention is directed to a manufacturing process of the noodle product which can be easily performed using conventional machinery.

French patent No. 2,502,907 discloses a method for the production of precooked solid food, especially pasta products and rice. The method includes precooking the food in slightly acidic water and cooling the product in slightly acidic water. Subsequently, the excess water is drained off and the product is oiled, inserted into flexible containers, and the sealed containers are heat sterilized.

European Patent No. 0489811 discloses a process for preparing an acid stabilized pasta, which includes cooking the pasta in an aqueous acidic solution or suspension having a pH of from 2 to 4 and containing a polymeric food-acceptable acid.

European Patent No. 0626137 discloses a pasteurized, shelf-stable, uncooked or partially cooked moist pasta product packaged in a sealed container. The pasta product has a moisture content from about 15% to about 38% and a pH below about 4.6.

European Patent No. 084083 discloses a process for the manufacture of noodle, in which a mixture of cereal semolina or flour and water is prepared in a twin-screw kneader. The mixture is converted into a band by pressing the mixture through a die with an oblong outlet orifice and thereafter, the band is laminated and cut into a noodle.

Despite the advances of the prior art in extending the shelf life of noodle products, a noodle product with a longer shelf life than conventionally prepared noodles is still needed. Moreover, a method of preparation which uses conventional equipment and is relatively easy to perform in comparison to conventional methods is still desirable.

SUMMARY OF THE INVENTION

The present invention is directed to a full moisture shelf stable noodle product comprising a mixture of between about 30% to about 45% dry matter in combination with an acid and an oil and having a pH of between about 3.7 to about 4.5. The dry matter comprises at least one of cereal flour, durum, hard wheat semolina, soft wheat flour, or semolina. The acid is a food grade organic or inorganic acid and is present in sufficient amounts to acidify the product. The oil is at least one vegetable oil, peanut oil, rapeseed oil, sunflower oil, palm oil, corn oil, or palm olein and present in an amount of between about 0.5% to about 5% by weight of the noodle.

Optionally, the noodle product may contain at least one additive of wheat protein, common wheat gluten, gliadin enriched wheat protein, egg material, a salt, a coloring agent, baking powder, a polysaccharide, or a flavoring agent.

The present invention is also directed to a process for manufacturing a full moisture shelf stable noodle product comprising the steps of preparing a homogeneous noodle dough having a dry matter content from between about 60% to about 75% by weight of the dough by adding water to the dry matter and kneading the mixture into the dough. Subsequently, sheeting and laminating the dough into a laminate to a thickness of from between about 0.6 mm to about 1.5 mm. Then slitting the laminate into noodles, cutting, blanching, and acidifying the noodles. Thereafter, the steps include portioning, packaging, and pasteurizing the noodles. The blanching step is conducted at a temperature of between about 95° C. to about 100° C. and for a time of between about 1 min to about 10 min. The blanching step can also include water-spraying the noodles with acidified water having a pH of between about 3.5 to about 5. The noodles can be cut to a length of between about 30 cm to about 50 cm and the portion weight is between about 70 g to about 200 g. During the acidification step, the noodles are dipped into acidified water containing between about 0.5% to about 2% acid until the noodles have a pH of between about 3.7 to about 4.5. The acid is any food grade organic or inorganic acid, and the step is conducted at a temperature of between about 18° C. to about 35° C. and for a time of between about 50 s to about 250 s.

The process includes a dry matter comprising at least one cereal flour, durum, hard wheat semolina, soft wheat flour, or semolina and optionally one additive. The additive can be at least one of wheat protein, common wheat gluten, gliadin enriched wheat protein, egg material, a salt, a coloring agent, baking powder, a polysaccharide, or a flavoring agent.

Optionally, the process includes premixing or prewetting the dry matter prior to preparing the dough or water cooling the noodles prior to packaging. The noodles can be water cooled at a temperature of between about 18° C. to about 35° C. and for a time of between about 30 s to about 2 min prior to packaging.

Additionally, the process can include an oiling step. In the oiling step, the noodles are oiled and the oil is present in an amount of between about 0.5% to about 5% by weight of the noodles.

DETAILED DESCRIPTION OF THE INVENTION

The present invention resolves the problem of the prior art by manufacturing a noodle product with an extended shelf life and by introducing a method for production of the noodle product with an extended shelf life. The benefits of the present invention include a full moisture extended shelf life noodle product of outstanding organoleptical quality. Another benefit is that the noodle product is easily prepared with little or no further cooking by the consumer. Thus, the noodle product can be consumed after simply heating the noodle product or after a very short cooking period, such as by cooking in a pan, a microwave oven, or by pouring hot or boiling water onto the noodle product. Alternatively, the product may be heated up in the package. Yet another benefit of the present invention is that the manufacturing process can be easily performed using conventional machinery.

As used herein, the term "noodle" includes any pasta or noodles based on cereal, semolina, or flour having the shape of a relatively thin band with a section which is generally rectangular or curved in the form of a semi-tube or oval.

As used herein, the term "western noodles" includes any pastas having the general shape of pasta noodles, such as spaghetti, fettuccine, angel hair, linguine, and similar products, and are generally prepared from hard wheat semolina and water. Additionally, "western noodles" can have a firm texture under the teeth, i.e., an "al dente" texture, after cooking in salt water for a sufficient period of time.

As used herein, the term "oriental noodles" includes any pastas having the general shape of an oriental noodle, such as beehoon noodle, mi-noodle, Hok Kian Mee, Ba Mee, Udon, Soba, and the like, and which are generally prepared from soft wheat flour and kansui solution. Additionally, "oriental noodles" can be expected to have a bouncy texture under the teeth after relatively brief cooking in a sufficient quantity of water with which they are intended to be consumed.

As used herein, the term "kansui solution" includes an aqueous alkaline solution, a solution of salts comprising at least one of NaCl, carboxymethylcellulose (CMC), $K_2CO_3$, $Na_2CO_3$, or sodium polyphosphate, and water. The salts exert a stabilizing effect on the bouncy texture of oriental noodles during their traditional consumption in their cooking water. Sodium chloride increases the firmness and the taste of oriental noodles; sodium and potassium carbonates lead to a firm and bouncy texture; sodium polyphosphate improves the hydration and water holding ability of the noodle product and to lean to a clean bite, i.e., a soft texture, but not gummy or mushy; and CMC increases the holding of the texture.

The present invention is directed to a full moisture noodle product with an extended shelf life which preferably comprises dry matter, acid, oil, and a pH range between about 3.7 to about 4.5 and a process of manufacture of the noodle product.

The dry matter includes ingredients commonly used as raw materials in the manufacture of noodle products. Suitable raw materials include mixtures comprising cereal flour, Durum, hard wheat semolina, soft wheat flour, or semolina. Preferably the raw materials include mixtures comprising Durum, hard wheat semolina, or soft wheat flour. More preferably, the noodle product of the present invention includes hard wheat semolina with a particle size between about 250 $\mu$m to about 350 $\mu$m to manufacture western noodles, or a soft wheat flour with a particle size between about 50 $\mu$m to about 150 $\mu$m to manufacture oriental noodles. The dry matter is present in an amount from between about 25% to about 60%, more preferably from between about 30% to about 45% by weight of the final product, or from between about 55% to about 90%, more preferably from between about 60% to about 75% by weight of the dough.

In particular, to manufacture western noodles, hard wheat semolina is mixed with water; and to manufacture oriental noodles, soft wheat flour may be mixed with kansui solution. The kansui solution includes an aqueous alkaline solution comprising NaCl from between about 0.5% to about 3%, CMC from between about 0% to about 1%, $K_2CO_3$, $Na_2CO_3$, or both from between about 0.1% to about 1%, and sodium polyphosphate from between about 0% to about 1%. Optionally, a coloring agent such as beta-carotene or riboflavin may also be added thereto.

Optionally, the dry matter includes one or more additive such as wheat protein, common wheat gluten, gliadin enriched wheat protein, enriched wheat protein such as the product marketed under the name of Flavor Pro by the company Midwest Grain Products Inc., Atchison, Kansas USA, starch, egg material, kansui solution, coloring agent, baking powder, oil, sodium chloride, polysaccharides, or spices. The amount of wheat protein, preferably common wheat gluten, gliadin enriched wheat protein, or Flavor Pro, present in the noodle product is in an amount sufficient to reduce stickiness and starch losses during cooking and acidification. The amount of wheat protein is between about 0.5% to about 5%, and preferably is between about 1% to about 3% by weight of the dry mixture.

Egg material includes whole egg powder, egg white powder, or liquid whole egg. One of ordinary skill in the art with little or no experimentation can determine the necessary amount of egg material in the noodle product of the present invention to increase the firmness of the noodle product. The amount of egg material is between about 0% to about 5% by weight of the dry mixture.

Baking powder includes sodium bicarbonate, and mixtures thereof. The baking powder should be in sufficient amount to create a porous noodle product which can determined by one of ordinary skill in the art with little or no experimentation. The amount of baking powder is between about 0% to about 1% by weight of the dry mixture.

Polysaccharides include guar gum, sodium alginate, calcium alginate, propylene glycol alginate, or mixtures thereof. The amount of polysaccharides present in the noodle product is in sufficient amount to improve the texture and the holding of the texture by the noodle. The amount of polysaccharides is between about 0% to about 3% by weight of the dry mixture.

The acid includes any food grade material with acidic properties. Preferably, the food grade acid is an inorganic or organic acid such as phosphoric acid, lactic acid, phosphoric acid, citric acid, or other materials such as glucono-$\Delta$-lactone, or mixtures thereof. The amount of acid is typically in sufficient amount to obtain a noodle with a pH range between about 3.7 to about 4.5, and preferably a pH range of between about 3.9 to about 4.3.

The oil includes any commercially available oil capable of lubricating the noodle product. Suitable oils include but are not limited to vegetable oil, peanut oil, rapeseed oil, sunflower oil, palm oil, corn oil, palm olein, or mixtures thereof. The oil should be in a sufficient amount to lubricate and flavor the noodle product. Preferably, the oil is in an amount of between about 0.5% to about 5% by weight of the cooked or precooked noodle product, more preferably in an amount of between about 1% to about 3%.

Optionally, an emulsifier may be added to the oil, preferably emulsifiers include at least one monoglyceride or mixtures of monoglycerides. The emulsifiers are present in an amount of between about 0.5% to about 2.5%, in % by weight of the oil, preferably in an amount of between about 1% to about 2%.

The pH of the noodle product according to the present invention ranges from between about 3.7 to about 4.5, preferably from between about 3.9 to about 4.3.

The process for manufacturing a full moisture shelf stable noodle product according to the present invention comprises the steps of preparing a mixture having a dry matter content of from between about 60% to about 75% by weight. Forming a dough by adding water to the dry matter and kneading the mixture to obtain a dough. Subsequently, sheeting the dough, laminating the sheet, and slitting the laminated sheet to obtain a noodle. Thereafter, the steps include cutting, blanching, dipping the noodle into an acidified water, portioning, packaging, pasteurizing the noodle product. Optionally, the process includes the steps of water cooling the noodle, oiling, packaging, and pasteurizing the noodle in a package.

During the first step, the mixture is prepared by adding water, a cereal flour or semolina, and optional additives to obtain a mixture having a dry matter content of from between about 60% to about 75% by weight of the noodle product. Optionally, the mixing step includes a premixing and prewetting step which delivers a premix in the form of moistened flour or semolina lumps, thus, saving space in the mixer. The optional premixing and prewetting step can be carried out in a rapid paddle mixer. Rapid paddle mixers include those available from Buhler, DeMaco, and Torresani.

During the mixing step, sufficient water is added to the mix to produce a dough with a water content between about 25% to about 40%, and preferably from between about 30% to about 35% by weight. Preferably to manufacture western noodles, hard wheat semolina is mixed with water, and to manufacture oriental noodles, soft wheat flour is mixed with kansui solution.

If a premixing and prewetting step is used, the moistened flour or semolina lumps obtained can be dosed with oil and placed into mixing means such as any mixer, kneader, extruder, or a combination thereof, as is well known in the art. Kneaders and extruders include those available from READCO TELEDYNE, Wenger, DeMaco, Torresani, Buhler, Werner, and Pfleiderer.

The dough is formed by kneading the mixture to obtain a dough using methods known to an artisan of ordinary skill in the art. The kneading step can be accomplished in the kneader or extruder of the mixing step or by using another extruder or kneader.

The sheeting step comprises sheeting the dough using any method known in the art. Preferably, the sheeting step includes pressing the dough through an oblong orifice by means of an extruder or kneader able to press the dough through such an orifice or by means of a positive pump such as a gear pump, or by pressing the dough between rollers. Preferably, the sheet has a thickness of from between about 2 mm to about 20 mm. Positive pumps include but are not limited to those available from Vacorex, Maag, Handtmann, MBC, Waukesha, Marlen, among others.

Subsequently, the dough is passed through a pair of rollers or a succession of pairs of rollers and laminated. Preferably, the dough is laminated to a thickness of from between about 0.5 mm to about 2 mm, preferably, between about 0.6 mm to about 1.5 mm. The rollers are in a succession of one to ten, preferably, the rollers are in a succession of two to five pairs of rollers with decreasing gaps. Once the sheet of dough has been laminated, the sheet is slit into strands of from between about 0.5 mm to about 20 mm, preferably between about 1 mm to about 10 mm in width by means of adequate roller knifes. The slit noodle may then be cut to any desired length to adjust for portion size and weight. The noodle length is between about 10 cm to about 100 cm, preferably, the noodle length is between about 30 cm to about 50 cm.

The step of portioning, i.e., cutting and collecting the noodle cuts into portions which are individually packaged, may be carried out at any stage after the cutting step and before the packaging step. Thus, after cutting and preferably after portioning, the noodle can be hot air treated to fix the shape and to get a product firmer in bite. The blanching step is performed to minimize starch losses during blanching by steaming or by steaming and hot water-spraying. The blanching step is performed at between about 90° C. to about 100° C. and for between about 30 s to about 15 min, preferably between about 95° C. to about 100° C. for between about 1 min to about 10 min. Preferably, the blanching step includes hot acid water-spraying having a pH of between about 3.5 to about 5. Preferably, when the blanching step includes steaming with steam then the blanching step is performed between about 98° C. to about 100° C. and when the blanching step includes spraying water the blanching step is performed between about 95° C. to about 98° C., preferably using acidified water having a pH from between about 3.5 to about 5.

During the blanching step, the water uptake may be such that the noodle has a dry matter content of between about 35% to about 52%, and preferably of between about 39% to about 47% of the noodle product.

The portion weight is between about 50 g to about 2000 g, preferably, the portion weight is between about 70 g to about 200 g.

Optionally, after the blanching step, the noodle may be showered with a hot water spray, i.e., the noodle is passed under a shower of hot water, to loosen the strands which can be slightly sticky after being steamed. The water temperature is between about 40° C. to about 80° C., preferably, the water temperature is between about 60° C. to about 70° C.

The noodle water cooling step is carried out in a bath of water at ambient temperature, i.e., at a temperature of from between about 18° C. to about 35° C., for an amount of time between about 30 s to about 5 min, preferably, between about 30 s to about 2 min. After water cooling, the excess water is drained off for between about 10 s to about 30 min, preferably, between about 30 s to about 2 min. During the water cooling step, the blanching step may be stopped completely and the water uptake may be such that the noodle has a dry matter content of from between about 30% to about 45% by weight of the noodle product, preferably from between about 33% to about 42%.

Thereafter, the acidifying stepping comprises dipping the noodle into an acidified water to be acidified to a final pH of from between about 3.7 to about 4.5, preferably between about 3.8 to about 4.3. The noodle may be dipped into water containing from between about 0.5% to about 2% acid and at ambient temperature. Preferably the acid is any of those mentioned above. The temperature is between about 10° C. to about 40° C. and the time duration is between about 30 s to about 300 s. Preferably, the temperature between about 18° C. to about 35° C., and the time duration is between about 50 s to about 250 s. After the acidifying step, excess acidified water is drained off for between about 30 s to about 2 min. During the acidifying step, there is little further water uptake. Not to be limited by theory, however, the acidification of the noodle appears to be mainly a result of osmotic equilibration.

The oiling step comprises coating the surface of the noodle with oil. The oil is present in an amount of from between about 0.5% to about 5% by weight of the noodle product, preferably between about 1% to about 3%. Optionally, an emulsifier is added to the oil to distribute the oil in very fine particles over the noodle surface. The emulsifier is present in an amount of between about 0.5% to about 2.5%, preferably, between about 1% to about 2%, in weight percent of the oil.

The oiling step may be carried out either before or during the packaging step. Preferably, the noodle product is packaged in a flexible pouch with controlled volume of head space. The noodle product is dosed into a vertical pouch with a sealed bottom and oil may be injected into the pouch before the top is sealed. Subsequently, the packaged noodle product is pack pasteurized.

The pack pasteurizing step is carried out in a steam medium wherein the center of the pouch reaches a temperature sufficient to pasteurize the contents of the pouch. Preferably, the pasteurization temperature is between about 80° C. to about 100° C. for a duration of between about 1 min to about 80 min. Thereafter, the pouches are cooled for between about 5 min to about 15 min in cold water containing a disinfectant, or for between about 30 min to about 60 min by chilled air at a temperature between about 5° C. to about 15° C.

In a preferred process of the present invention, the steps comprising of dipping the noodle into an acidified water, oiling, packaging, and pack pasteurizing are replaced by steps comprising directly oiling, packaging, and freezing. The freezing step replaces the acidification step. In the latter process the noodle product may be thawed before unpacking or afterwards, preferably during heating up or during a short cooking period.

The present manufacturing process may be implemented by means of normal equipment commonly used in the art. Such equipment includes a mixer, single or twin screw kneader, single or twin screw extruder, kneader-sheeter equipped with corrugated rollers, rollers having a smooth surface, steeping unit, steam/water spraying blancher, water bath, shower and pasteurizing unit from the noodle or noodle industry.

EXAMPLES

Certain embodiments and features of the invention are now illustrated, but not limited, by the following working examples. The percentages and parts are by weight unless otherwise stated.

Example 1

A precooked western noodle product having a long shelf life was made from a mixture having a dry matter content of 68.2% and comprising 76% Durum semolina, having a particle size of 250–300 μm, 2.35% Flavor Pro 6000, and about 21% tap water.

The Durum semolina and Flavor Pro 6000 were premixed with water in a rapid paddle mixer. The semolina lumps were dosed into a kneader where they were further mixed. The mixture was kneaded into a dough and the dough was sheeted by pressing the dough through means of a gear pump through a die having a rectangular orifice of 2 mm×100 mm. The kneader was a READCO-type TELEDYNE kneader and the gear pump was a VACOREX 90/90-type MAAG pump.

A temperature of 48° C. was maintained in the kneader barrel by circulating a heating fluid. Subsequently, the kneader was fed with 1000 kg/h of semolina lumps. The speed of rotation of the kneader screws was adjusted to 70 rpm. Thereafter, the dough was subjected to a relative pressure of 800 kPa in the kneader.

The speed of rotation of the toothed rollers of the gear pump was adjusted to 36 rpm and the relative pressure exerted by the pump on the dough was 11,000 kPa. The sheet of dough leaving the die had a thickness of 3–4 mm. Subsequently, the sheet was laminated to a thickness of 1.2 mm by passing the dough through four pairs of laminating rollers with successively decreasing gaps of 2, 1.5, 1.3 and 1 mm. Afterwards, the laminated sheet was slit into strands of noodle of about 8 mm in width which were cut to about 25 cm in length and portioned or dosed in 104 g portions.

The noodle was then blanched at about 98° C. for about 200 s along a tunnel blancher in which steam injection means injected steam at 99° C. and water spraying means sprayed acidified water having a pH of 4.3 and a temperature of 96–97° C. During the blanching step, the water uptake was such that the noodle had then a dry matter content of from between about 41 to about 45%.

After the blanching step, the noodle was showered with a hot water spray having a temperature of from between about 60° C. to about 70° C., and it was then water cooled in a bath of water at from between about 20° C. to about 25° C. for 45 s. During the water cooling step, the water uptake was such that the noodle had then a dry matter content of from 38 to 42%.

After water cooling, excess water was drained off for 60 s. The noodle was then dipped into a water bath containing 1.6% lactic acid, having a pH of between about 2.2 to about 2.3 and having a temperature of 30° C., for 150 s. During the acidifying step, the water uptake was such that the noodle had then a dry matter content of from 36 to 40%.

After the acidifying step, excess acidified water was drained off for 60 s. After the acidifying step the noodle had a pH of between about 3.9 to about 4.0.

The noodle portions then weighing about 180 g were dosed into vertical pouches after their bottoms had been sealed, and 1.8 g palm olein were injected into each pouch before their tops were sealed.

The noodle was in pack pasteurized in steam at 97° C., the temperature in the center of the pouch reaching a temperature of 85° C. after 20 min and this temperature being held for 10 min. The pouches were then cooled for 10 min in water having a temperature of 10° C. and containing a disinfectant. The pouches were subsequently stored at room temperature, at about 25° C.

The noodle product could be prepared for consumption by unpacking and heating up. The noodle did not stick together and it had outstanding organoleptical properties. In particular, the noodle had a texture similar to the texture of fresh "al dente" cooked western noodles.

Example 2

A precooked oriental noodle product having a long shelf life was made from a mixture having a dry matter content of about 66.6% and comprising 72.45 parts soft wheat flour, having a particle size of 50–120 μm, 0.86% palm olein and 26.69% kansui solution having the composition indicated in Table 1.

TABLE 1

| Kansui Solution | % w/w |
|---|---|
| NaCl | 0.65 |
| Carboxymethylcellulose (CMC) | 0.12 |
| $K_2CO_3$ | 0.53 |
| $Na_2CO_3$ | 0.24 |
| $Na(PO_3)_n$ | 0.3 |
| Riboflavin | 0.02 |
| Soft Water | 98.14 |

The soft wheat flour and kansui solution were premixed in a rapid paddle mixer. The semolina lumps thus obtained were dosed together with the palm olein into a twin screw extruder and were mixed and kneaded into a crumbly dough having a pH of about 8. The crumbly dough was then brought into a kneader-sheeter which formed a dough sheet of about 8 mm in thickness.

The sheet was laminated to a thickness of 1.6 mm by passing through five pairs of laminating rollers with successively decreasing gaps of 4.2, 3.5, 2.4, 2.2 and 1.63 mm. The laminated sheet was slit into strands or noodle of about 2 mm in width which were cut to the length of between about 40 cm to about 42 cm. The cuts were collected to portions of between about 80 g to about 82 g.

Subsequently, the noodle was blanched at about 98° C. for 180 s along a tunnel blancher in which steam injection means injected steam at 99° C. and water spraying means sprayed acidified water having a pH of about 3.7 and a temperature of between about 96° C. to about 97° C. During the blanching step, the water uptake was such that the noodle had then a dry matter content of from between about 41% to about 43%.

After the blanching step, the noodle was showered with a hot water spray having a temperature of from between about 60° C. to about 70° C. Thereafter, the noodle was water cooled in a bath of water at 20° C. for 45 s. During the water cooling step, the water uptake was such that the noodle had then a dry matter content of from between about 38% to about 40%. After water cooling, excess water was drained off for 60 s.

The noodle was then dipped into a water bath containing 1.5% lactic acid, having a pH of 2.5 and having a temperature of 30° C. for 210 s. During the acidifying step, the water content increased by about 1% and the pH decreased to between about 3.9 to about 4.0. After the acidifying step, excess acidified water was drained off for 60 s.

The final noodle product pH was between about 4.0 to about 4.1 and the final dry matter content was between about 39% to about 41%.

The noodle portions weighed about 132 g and were dosed into vertical pouches after their bottoms had been sealed, and 1.5 g palm olein were injected into each pouch before their tops were sealed. The noodle was in pack pasteurized in steam at 97° C. The temperature in the center of the pouch reached a temperature of 85° C. after 18 min and the temperature was held for 10 min.

The pouches were then cooled for 10 min in water having a temperature of 10° C. and containing a disinfectant. The pouches were subsequently stored at room temperature, at about 25° C.

The noodle product could be prepared for consumption by unpacking and heating up. The noodle product did not stick together. It had outstanding organoleptical properties, especially a bouncy texture similar to the texture of fresh cooked oriental noodles.

What is claimed is:

1. A process for manufacturing a full moisture shelf stable noodle product comprising the steps of:
    preparing a homogeneous dough having a dry matter content from between about 60% to about 70% by weight of the dough by adding water to the dry matter and kneading the mixture into the dough;
    sheeting and laminating the dough into a laminate;
    slitting the laminate into noodles;
    blanching the noodles, wherein the blanching step is conducted at a temperature between about 95° C. to about 100° C. and for a time between about 1 min to about 10 min while steaming with steam at a temperature from about 98° C. to about 100° C.;
    cutting and portioning noodles; and
    packaging and pasteurizing the cut and portioned noodles.

2. The process according to claim 1, wherein the dry matter comprises at least one of cereal flour, durum, hard wheat semolina, soft wheat flour, or semolina; and the laminate is prepared with a thickness of from between about 0.6 mm to about 1.5 mm.

3. The process according to claim 1, wherein the dry matter further comprises at least one additive of wheat protein, common wheat gluten, gliadin enriched wheat protein, egg material, a salt, a coloring agent, baking powder, a polysaccharide, or a flavoring agent; and the noodles are cut to a length of between about 30 cm to about 50 cm and the portion weight is between about 70 g to about 200 g.

4. The process according to claim 1, further comprising premixing or prewetting the dry matter prior to preparing the dough.

5. The process according to claim 1, wherein the blanching step further comprises spraying water at a temperature between about 95° C. to about 98° C.

6. The process according to claim 1, wherein the blanching step includes water-spraying the noodles with acidified water having a pH of between about 3.5 to about 5.

7. The process according to claim 1, further comprising the step of water cooling the noodles at a temperature of between about 18° C. to about 35° C. and for between about 30 s to about 2 min prior to packaging.

8. The process according to claim 1, further comprising the step of acidifying the noodles by dipping the noodles into acidified water containing between about 0.5% to about 2% acid until the noodles has a pH of from between about 3.5 to about 4.5.

9. The process according to claim 8, wherein the acid is a food grade organic or inorganic acid, and the acidifying step is conducted at a temperature of from between about 18° C. to about 35° C. and for a time of between about 50 s to about 250 s.

10. The process according to claim 1, further comprising the step of oiling the noodles wherein the oil is present in an amount of between about 0.5% to about 5% by weight of the noodles.

* * * * *